US006690263B1

(12) United States Patent
Grieu

(10) Patent No.: US 6,690,263 B1
(45) Date of Patent: *Feb. 10, 2004

(54) METHOD OF MANAGING COLLISIONS IN A NON-CONTACT DATA INTERCHANGE SYSTEM

(75) Inventor: Francois Grieu, Paris (FR)

(73) Assignee: Innovatron Electronique, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/381,019

(22) PCT Filed: Jan. 15, 1999

(86) PCT No.: PCT/FR99/00079

§ 371 (c)(1),
(2), (4) Date: Dec. 6, 1999

(87) PCT Pub. No.: WO99/36877

PCT Pub. Date: Jul. 22, 1999

(30) Foreign Application Priority Data

Jan. 15, 1998 (FR) .............................. 98 00383

(51) Int. Cl.[7] .................................................. H04Q 5/22
(52) U.S. Cl. ................ 340/10.4; 340/572.4; 340/10.32; 340/10.2; 340/572.2
(58) Field of Search .......................... 340/572.1, 10.2, 340/10.3, 10.32, 10.4, 10.41, 572.4

(56) References Cited

U.S. PATENT DOCUMENTS 4,647,931 A    3/1987  Mawhinney
5,625,628 A    4/1997  Heath
5,729,542 A    3/1998  Dupont
6,459,704 B1  10/2002  Jandrell

FOREIGN PATENT DOCUMENTS

| EP | 0 553 905 A1 |   | 8/1993 |
|----|--------------|---|--------|
| EP | 0553905      | * | 8/1993 |
| EP | 0 702 324 A2 |   | 3/1996 |

OTHER PUBLICATIONS

U.S. patent application Ser. No. 09/381,002, field Feb. 14, 2000.

* cited by examiner

Primary Examiner—Julie Lieu
(74) Attorney, Agent, or Firm—Nixon & Vanderhye, P.C.

(57) ABSTRACT

A method manages collisions in a system for interchanging data between portable objects and at least one terminal suitable for co-operating with a plurality of the portable objects simultaneously. The terminal sends out call messages to the portable objects. A portable object conditionally sends a message to the terminal in response to the call with a probability that may be less than 100%, the response containing an identifier specific to the portable object. The receiver receives a response from an identified portable object and in absence of the response colliding with a response sent out by another portable object, a specific data communication link is established between the terminal and the identified portable object. The portable object modulates the probability of response over time depending on whether or not it has itself already responded previously to a call message sent out by the terminal.

17 Claims, 1 Drawing Sheet

METHOD OF MANAGING COLLISIONS IN A NON-CONTACT DATA INTERCHANGE SYSTEM

FIELD

Figure 1:
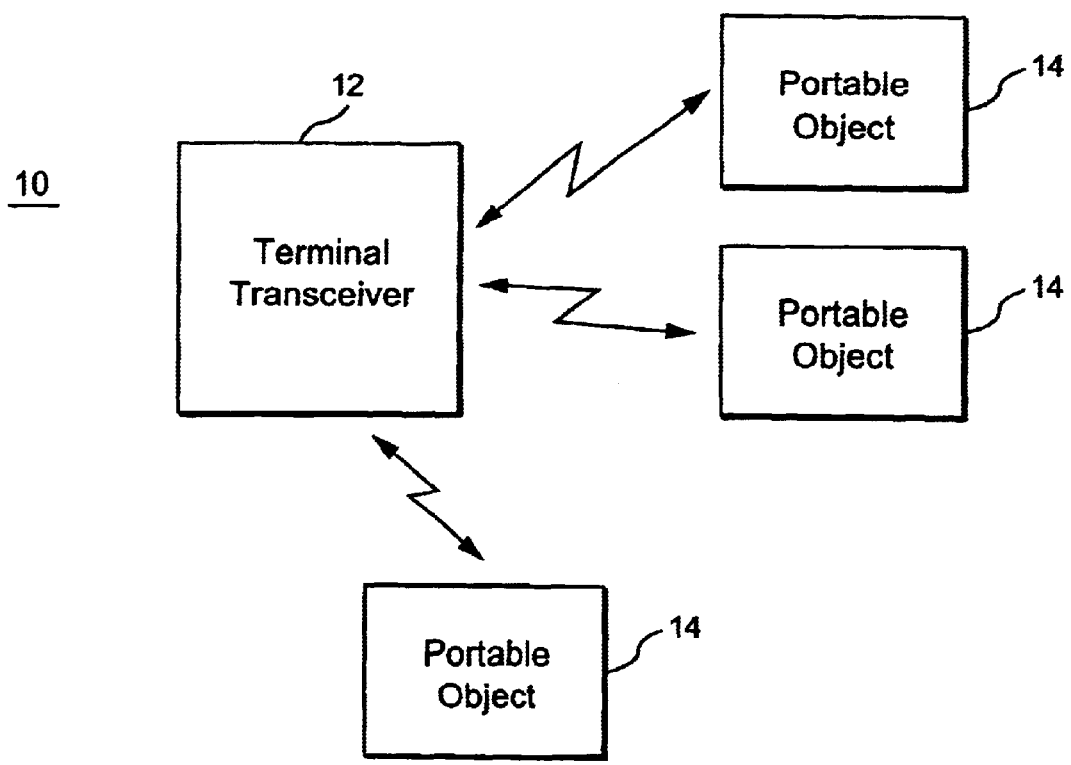

The invention relates to contactless communication between a portable object and a terminal.

BACKGROUND

Contactless data interchange is well known; applications of this technique include, in non-limiting manner, controlling access and remote payment, e.g. for access to and payment for public transport.

In this example, each user is provided with a portable object of the "contactless card" or "contactless badge" type, which object is capable of interchanging information with a fixed terminal or station by moving the portable object close thereto so as to enable mutual non-mechanical coupling to take place therebetween (the term "terminal" is used herein to designate a data transceiver terminal suitable for co-operating with portable objects).

The invention relates to the particular situation in which a plurality of portable objects can be present simultaneously in the field of action of the terminal, and where there are no physical means, e.g. insertion into a slot, for isolating the arrival of a single object only in said field.

BRIEF DESCRIPTION OF HE DRAWINGS

FIG. 1 shows a contactless communication system 10 including a terminal transceiver 12 and plural portable objects 14 in the terminal's field of action.

The object is to interchange data with a selected one of the portable objects. For this purpose, a unique or quasi-unique identifier is given to each portable object. If a portable object is in range of the terminal, it transmits its identifier to the terminal. This transmission can be interfered with if a plurality of portable objects respond simultaneously. However, if the terminal receives an identifier correctly, then the terminal sends a message that includes the identifier so that the cards which receive the message process it only if the identifier matches their own identifier, thereby triggering data interchange between the terminal and one specific card.

Insofar as the signals transmitted by the various portable objects may overlap one another in time, the terminal must be provided with an "anticollision" mechanism making it possible to detect such situations and to handle them by causing the portable objects to retransmit their signals.

Various types of anticollision methods exist at present, and particular mention can be made of the following:

"Slotted aloha" in which each of the portable objects responds to a general call transmitted by the terminal in one out of a plurality of predefined time slots that are selected randomly by the cards, and the terminal then selects only one of them for dialog (see French Patent Application No. FR-A-2 666 187). The probability of a card responding to the call is set at 100%. Selection is successful if the response of a style card is to be found on its own in one of the slots.

"Probabilistic" in which the probability of each card responding to a general call following a collision between replies received by the terminal is less than 100% and is decreased until a single response is obtained (cf. French patent application 97 02501 dated Mar. 3, 1997 entitled "A method of managing collisions in a system for contactless data interchange"). The general call may merely include an indication as to whether or not a collision occurred during the preceding general call, in which case each card defines its own increase or decrease in its probability of making a response, as in European Patent Application No. EP-A-702 324; however it is preferable, as in French application 97 02501, for the general call to include a parameter that is defined by the terminal as a function of collision history, and it is the value of this parameter which defines the probability of a card responding.

SUMMARY

The present invention is based on the observation that some of the aspects of those two systems can advantageously be combined in order to obtain an improved compromise between the various factors that influence the performance of the system, such as the maximum number of simultaneously present portable objects that can be processed, the duration of the general call cycle that enables all of the portable objects that may be present to respond, and the duration of the general call cycle in the presence of a single portable object (which is often the most usual situation).

Also, if populations of portable objects of several different types coexist, it is advantageous to have a "hybrid" system in which a single terminal can operate equally well with portable objects of various types, and even with portable objects of more than one type each. In an exemplary embodiment of the present invention, a hybrid portable object preferably also operates with terminals that are designed for one type of method only.

More precisely, the method of the invention is of the type comprising the following steps in succession: a) the terminal sends out call messages to the portable objects; b) a portable object conditionally sends a message to the terminal in response to the call with a probability that may be less than 100%, the response containing an identifier specific to the portable object; c) the receiver receives a response from an identified portable object and in the absence of the response colliding with a response sent out by another portable object, a specific data communication link is established by the terminal and the identified portable object, and data is then interchanged, after which the method returns to step a) for a new iteration; and d) in the absence of collision-free reception, the method returns to step a) for a new iteration.

According to the invention, the portable object modulates the probability of response over time depending on whether or not it has itself already responded previously to a call message sent out by the terminal.

In various advantageous embodiments:

the probability of response also depends on a probability modulation parameter sent out by the terminal;

the probability of response is increased over time if the portable object has not itself previously responded to a call message sent out by the terminal, and in particular it is increased up to 100% in a finite time slot or after a finite number of messages sent by the terminal;

the portable object reinitializes the probability of response after responding to a call message sent out by the terminal;

the call message includes a field representing one or more types of application managed by the terminal, the portable object contains in its memory one or more types of application for which it is intended, and the portable object compares the application types received with the call message with the application types contained in its memory, and inhibits responding in step b) whenever the comparison detects no application type in common;

the terminal sends out two types of call message: Query messages initializing the value of the probability of response by the portable objects, and Marker messages sent out in succession after Query messages, where Marker messages are suitable for causing the portable objects optionally and in the absence of any prior response to a call message to modulate the probability value on receiving a Marker message;

in the above case, the portable objects respond selectively in time slots following reception of Marker messages, which selection between time slots may in particular be determined in probabilistic manner by drawing a random or pseudo-random number in the portable object on receiving a Query message; the terminal may also send an interrogation message again on detecting a collision; the portable object may modulate the probability value on receiving a Marker message in the absence of any prior response to a call message as a function of the value of an index that is modified on receiving a Marker message, in particular an index which is incremented each time a new marker message is received and which is reinitialized on receiving a subsequent interrogation message;

the terminal reduces the time interval between two successive call messages in the absence of any response from an identified portable object within a predetermined period; and a portable object can be inhibited from sending out a response to a call message by the portable object receiving a special message sent out by the terminal and containing an identifier corresponding to that of the portable object, inhibition being removed on initialization of the portable object and/or on reception of a message for that purpose.

There follows a detailed description of the method of the invention showing various implementations thereof.

The description begins with the probabilistic system of U.S. application Ser. No. 09/380,486 and the notation used is described. In addition, since the portable objects are often in the form of cards, they are often referred to as "cards" for convenience, but that is not limiting in any way.

The reader sends out a general call in repetitive manner comprising an interrogation message (referred to below as a "Query") containing a parameter P, and it then puts itself in a situation to receive any response that may come from a card. Each card which detects the Query decides whether or not to respond with a probability that is a function of P and of a random number X that is drawn in the card. The response of the card (or "answer to Query", ATQ) includes at least one identifier that is unique to each card, and optionally includes other identification elements.

In a later step, the reader sends out at least one application message containing the identifier, and only the card that has the identifier responds thereto (i.e. the cards perform a comparison step with their own identifiers for this or these subsequent messages).

optionally, an application message is accompanied by a shorter identifier selected by the reader. In application messages following acknowledgment of the card of the first application message, the short identifier can be used to replace the initial unique identifier (for the purpose of reducing the volume of data that is interchanged). The unique identifier may be a predetermined serial number or it may be a random number on four 8-bit bytes, for example. This second option has the advantage of not enabling a card to be recognized from one use to another, thereby making it impossible to track use thereof solely by the identifier mechanism. For a random identifier, the identifier is selected by each card on initialization or on receiving a Query, and it can be used by the sequence of selected responses, for example in a method of the same type as the above-mentioned "Slotted Aloha" variant.

DETAILED DESCRIPTION

The present invention seeks to determine the probability of the card responding to an interrogation message from the reader by the card performing calculation to cause the probability to vary depending on whether or not the card has already responded during preceding interrogations. This assumes that a state variable exists in the card representative of these past decisions (referenced I below). The interrogation message Query preferably contains a probability modulating parameter P like the system of U.S. application Ser. No. 09/380,486, although that feature is optional.

In a first Example A, this is particularly simple:
a) the reader sends out interrogations in a regular manner, all of which interrogations are identical without any parameter;
b) on being switched on or on coming into range, the card initializes an internal variable I=1; and
c) on receiving any call from the reader, the card randomly selects an integer in the range [1 . . . I]; if the selected number is 1, the card responds to the interrogation from the reader by sending its own identifier, and it reinitializes I=8; otherwise, the card decreases I by 1 and it does not send its own identifier.

It can be seen that the probability of a card responding to a call from the reader is 1 at the end of step b), so all cards respond to the first call, after which the probability is 1/8 at the end of step c). To the following calls, the probability is reset to 1/8 if the card has responded; otherwise so long as the card continues not to reply, the probability of it responding passes successively through 1/7, 1/6, 1/5, 1/4, 1/3, 1/2, and 1. Therefore, a maximum of eight interrogations passes between two responses being made by the card, thereby guaranteeing that within a maximum of eight interrogations, the reader will know the identifier of the card, providing the card is close enough to ensure there is no error of communication and providing no collision occurs.

In a variant (Example B) the card behaves in the same way, but random numbers are drawn in simplified manner and the number of draws is reduced:
c) on receiving a call from the reader, the card examines I; if I=1, the card responds to the interrogation from the reader by sending its identifier and it reinitializes I to an integer which is selected randomly in the range [1 . . . 8]; otherwise the card reduces I by 1 and it does not send its identifier.

An improvement of more general application consists in the reader being able to parameterize the probability of the card responding; for example it can accompany each interrogation with a parameter P that is used in step c) instead of using the constant 8. The reader can thus supply an optimum value, e.g. a value that increases with increasing size of the range over which the reader can communicate, or with its purpose if that purpose increases probability of a plurality of cards being present simultaneously. An additional improvement consists in the reader increasing the parameter if it detects collisions and decreasing the parameter if it does not.

An improvement that can be applied independently of the preceding improvement consists in providing another parameter A in the call from the reader, for comparison with a predetermined value recorded in the memory of the card, with response to a call being inhibited depending on the result of the comparison. Inhibition can take place, for example, if the parameter A that identifies the type of application for which the reader is intended (from amongst purse, bank credit/debit card, telephone card, card giving access to a swimming pool, . . . ) does not corresponding to the value recorded in the card and representing the purpose of the card, i.e. inhibition takes place if no element is present in the intersection between the set of applications processed by the reader and described by A, and the set of applications processed by the card and described in the memory of the card. This improvement serves to limit the number of cards that might respond to cards from which a response is pertinent, thereby reducing the probability of collision.

Another independently applicable improvement is for the reader to change the rate at which it sends out interrogations depending on whether or not it detects a message from at least one card: if, after a preceding interrogation, the reader has detected no response, then the next interrogation is closer to said preceding interrogation than it would be if the reader has detected a response from a card. The effect is to increase the number of interrogations while nevertheless making it possible to receive in full the response from a card if such a response is indeed received. The waiting period between the end of one interrogation and the beginning of the next in the absence of any response from a card being detected is selected as the sum of the maximum period between the end of an interrogation and the beginning of a response from a card plus at least the period required for activating the apparatus of a reader detecting a card response (typically apparatus detecting the subcarrier sent out by the card).

An independently applicable improvement consists in providing two sorts of reader interrogation referred to as "Query" and as "Marker". Query reinitializes response probability (Query may contain a parameter P). Marker causes a card to respond with a probability that varies depending on whether or not it has previously responded. For example, this improvement can modify Example A as follows:

b) on being switched or on coming into range, the card reinitializes its internal variable I=0; and c) on receiving a call from the reader, the card determines whether the call is of the Query type, and if so it reinitializes I to an integer selected randomly in the range [1 . . . 8], and then behaves in the same way as with a Marker. In both cases, if I=1 the card responds to the interrogation from the reader by sending out its identifier. Thereafter, in all cases, it decreases I by 1, unless I is already zero.

It can be seen that the probability of the card responding after a Query is 1/8 and then, if it continues not to respond, the probability after a Marker passes successively through 1/7, 1/6, 1/5, 1/4, 1/3, 1/2, 1. Following a response from the card, or at the end of step b), the probability of response to a Marker, if any, is 0 until the next Query. An advantage is that if the parameter P and/or A is used, it need be used only in a Query.

When a card has received an application message for which comparison with its own identifier, whether short or long, has given a positive result, the card stores this event and no longer responds to a Query or a Marker from the reader until some particular event has occurred, such as reinitialization of the card and/or a message has been received from a reader having some special characteristic. This makes it possible for the mechanism to avoid enumerating cards that have already been processed, thereby reducing the probability of collision and increasing the density of Queries and of Markers in time.

A variant consists in Markers being numbered by the reader, and in said incremented number being taken into account in the probability of a card responding; for example, the number may be compared with I (with response from the card being inhibited in the event of a mismatch), or more generally the number may be combined with the state variable contained in the card.

Another variant consists in providing for the state variable to be inhibited and/or modified in the event of inconsistency of certain characteristics (such as a check sum) of the information received by the card.

In a more general implementation of the present invention, the probability of a card responding to a Query is a function of two integers M and N. The decision whether or not to respond is taken in the card and comprises the following steps:

the numbers M and N are determined, at least one of which is a function of P;

a uniformly distributed random number is drawn for an integer X where $0 \leq X < N$; and a response is made if X is less than M, i.e. with probability M/N.

Two special cases of such methods correspond to systems that are already in existence:

in an example of the probabilistic system, N=64 and M=P+1, i.e. the probability of response is (P+1)/64;

in a Slotted Aloha type system, then $N=2^P$ and M=1, i.e. the probability of response is $1/(2^P)$.

Nevertheless, in both cases, only one of the parameters M and N is variable, while the other is fixed. The fact that both of them are variable gives the advantage of flexibility in selecting the characteristics of the anticollision function.

The two parameters M and N could be numbers contained in the general call message cycle, but at least one of the parameters may also be constituted or derived in the card itself In the examples below, it is assumed that the message Query as sent out by the terminal contains a number M defining P and that it is capable of varying, for example in the manner described in U.S. application Ser. No. 09/380, 486, as in a preferred implementation of the invention. Dynamically varying the parameter P as a function of detected collisions remains applicable.

The various variable parameters described in the examples below can be employed on their own while using a variable parameter M, or they can be associated with a plurality thereof, or it is even possible for a plurality of them to be used without using any such parameter M.

EXAMPLE NO. 1

Query includes an application selection field A which conditionally inhibits response from cards; for example a card responds if the conditions precedent on P and X are both satisfied and providing A is equal to a predetermined value contained in the card. This makes it possible to reduce the probability of collision when a plurality of cards are in range of the reader, but it is known that only those cards that carry a certain application as specified by A are suitable for being processed. The condition on A could naturally be more complex, for example A could be a list of applications, and the card could respond if any one of those applications is present in a list of applications stored in the card.

EXAMPLE NO. 2

After Query, the reader can send out one or more Marker messages that are distinguishable from Query. These Marker messages can be used to time the ATQ responses from cards, thereby making it possible to save time in the transmission and management of responses.

Several variants are possible.

Case 2.1: The Marker messages contain an index I, or they make it possible for the cards to derive such an index I, (optionally the messages could also include the parameter P and perhaps also A). I is initialized (e.g. to 0) on each Query and it is incremented on each Marker. This numbering mechanism can be implemented in the reader and can be included in the Marker message and/or in the card (which initializes I to 0 on sending out and/or receiving a Query, and which increments it on sending out and/or receiving a Marker). This numbering mechanism is implemented at least in the reader or in the cards, so that the value of I is known to the cards on receiving a Marker.

The card responds with an ATQ to a Marker as a function of I, P, and a random draw X (P and X can be those of a preceding Query or Marker and are not necessarily recalculated on each Marker). The probability of the card responding is higher if the card has not yet responded since the preceding Query than it would be if the card has already responded. Also, in the event of a collision after a Marker, the method can return to the Query message and repeat the call cycle with I being reinitialized so that the overall probability of response from the cards in range of the terminal increases when there is no collision and decreases when collision occurs. This example of the method is advantageous when a message at the end of data interchange inhibits any further response from a card that has already responded, at least until a subsequent general call.

Typically, A, P, and the random draw X are defined for the Query message and the response condition is that $I*M \leq X \leq I*M+M$. As a result, after N/M messages (one Query and N/M-1 Markers, after which the cycle restarts) all of the cards will have responded at least once.

This improvement provides an advantageous characteristic of the "Slotted Aloha": for any value of the parameter P, for a single card in range of the reader, and in the absence of a communications error, it is certain that the identifier of the card will be picked up in a bounded number $2*N/M$ of messages counting from the card coming into range, and assuming that the card responds only from the first received Marker message.

It can be seen that a result is obtained which is comparable to a "Slotted Aloha" having N/M slots, with the exception that the beginning of the slots is indicated explicitly by the reader by sending out the Markers, instead of being implicit in the timing performed by the cards. Compared with the "Slotted Aloha" this avoids accurate timing, both by the cards and by the reader. Another advantage over the probabilistic system is that if P is absent from the Markers (and A, see above), the duration of the Marker is shorter than that of a Query, and the card does not necessarily have to draw another random number on each Marker, thereby further reducing the duration of the cycle. Indeed, the card can respond systematically to the $n^{th}$ Marker, where n is a number characteristic of the card, e.g. a portion of its serial number.

It will be observed that if the terminal sends out Queries only without any Markers, then the terminal is equivalent to the probabilistic system, and the cards of this example are compatible with terminals of both systems.

Case 2.2: Provision can be made for the reader to include the index I in the subsequent application(s) (in particular the first application message), and for this field of the application message to be compared by the card with the index I, in the same way as the card compares its own identifier with a field of the application message; this reinforces the selectivity of the selection message without lengthening the identifier field in the ATQ.

Case 2.3: Provision can be made for numbering to be both explicit in Markers and implicit by the card, and for the card to respond only if there is a match; this case is advantageous above all when used in addition to the preceding improvement.

EXAMPLE NO. 3

In a variant or in addition to the preceding examples, the terminal can vary the interval between two successive Markers. In particular, if no ATQ response is received by the terminal, there is no longer any need to wait for the usual length of time for data to be interchanged between a card and the terminal. In this example, if a card responds to a Query or a Marker, it does so by sending out a signal (start of ATQ) within a maximum length of time $T_0$ following the end of the Query or Marker. The reader looks for this signal, and if its not present within an appropriate length of time ($T_1 \geq T_0$+ detection time by the reader) following the end of Query, it immediately sends out a new message of the Query type or the Marker type. In the presence of such a signal, the sending out of a Query or a Marker is therefore inhibited until the end of sending from the cards (at least until a predetermined time $T_2$ has elapsed corresponding to the maximum length expected of a response, and/or so long as an error or a collision has not been detected by the reader in the message received from the card(s)).

The advantage is to read cards more quickly since the number of Queries (and/or Markers) per unit time is considerably increased. Assuming that the duration of the ATQ is long compared with a Query or a Marker, and particularly in a system using Example No. 1, the opportunities for response by the cards are much more numerous.

What is claimed is:

1. A method of managing collisions in a system of interchanging data between a plurality of portable objects and a data transceiver terminal suitable for cooperating with the portable objects simultaneously present in a communicating range of the terminal, the method comprising the following steps:

a) transmitting call messages from the at least one terminal to the plurality of portable objects, at least one of the terminal, the call messages, and the portable objects including a probability modulation parameter (PMP), the probability modulation parameter corresponding to a probability that at least one of the portable objects will respond to the call messages, wherein the one portable object changes the probability modulation parameter based on whether the one portable object previously responded to the call messages transmitted by the terminal;

b) using the PMPs corresponding to those portable objects, determining which ones of the portable objects will respond to the call messages;

c) transmitting a response message from each portable object determined in step (b) to respond to the call messages, each response including an identifier uniquely identifying the respective portable object transmitting the response message;

d) upon the terminal receiving at least one response message and determining an absence of a collision between the respective response messages of portable objects, establishing a specific data communication link between the at least one terminal and each of portable object transmitting the response message, respectively, and repeating steps (a) through (d);

e) upon the terminal determining a collision between the response messages of portable objects and not receiving the response message from any of the portable objects, repeating steps (a) through (d); and wherein the terminal sends out two types of call messages: query messages initializing the probability modulation parameter and marker messages sent out after the query messages for causing the portable objects optionally and in the absence of any prior response to the call messages to modify the probability modulation parameter upon receiving one of the marker messages.

2. The method of claim 1, wherein the probability modulation parameter is sent out by the at least one terminal.

3. The method of claim 1, wherein the probability modulation parameter is increased over time if the portable object has not previously responded to a call message sent out by the at least one terminal.

4. The method according to claim 3, wherein the probability modulation parameter is increased up to a 100% probability of a response by at least one of the plurality of portable objects over a finite time interval or after a finite number of call messages has been sent out by the at least one terminal.

5. The method of claim 1, wherein the portable object reinitializes said probability modulation parameter after responding to the respective call message sent out by the at least one terminal.

6. The method of claim 1, wherein the portable objects respond selectively in time slots following reception of the marker messages.

7. The method of claim 6, wherein selection between time intervals is determined in a probabilistic manner by drawing one of a random number and a pseudo-random number in the portable object on receiving one of the query messages.

8. The method of claim 1, wherein the at least one terminal sends out one of the query messages again on detecting a collision.

9. The method of claim 1, wherein the at least one terminal reduces a time interval between two successive call messages in the absence of any response from an identified portable object within a predetermined period.

10. A method of managing collisions in a system of interchanging data between a plurality of portable objects and a data transceiver terminal suitable for cooperating with the portable objects simultaneously present in a communicating range of the terminal, the method comprising the following steps:

a) transmitting call messages from the terminal, at least one of the terminal, the call messages, and the portable objects including a probability modulation parameter (PMP), the probability modulation parameter corresponding to a probability that one of the portable objects will respond to one of the call messages, wherein the one portable object changes the probability modulation parameter based on whether the one portable object previously responded to one of the call messages transmitted by the terminal;

b) using the PMPs corresponding to those portable objects, determining which ones of the portable objects will respond to the call messages;

c) transmitting a response message from each of portable object determined in step (b) to respond to the call messages, each response message including an identifier uniquely identifying the respective portable object transmitting the response message;

d) upon the terminal receiving at least one response message and determining an absence of a collision between the respective response messages of portable objects, establishing a specific data communication link between the terminal and each portable object transmitting the response message, respectively, and repeating steps (a) through (d);

e) upon the terminal determining a collision between the response messages of portable objects and not receiving the response message from any of the portable objects, repeating steps (a) through (d); and wherein the call message includes a field representing one or more types of applications managed by the terminal, the portable object contains in its memory one or more types of applications for which the portable object is intended, and the portable object compares the application types received with the call message with the application types contained in memory of the portable object, and inhibits responding in step b) whenever the comparison detects no application-type in common.

11. A method of managing collisions in a system of interchanging data between a plurality of portable objects and a data transceiver terminal suitable for cooperating with portable objects simultaneously present in a communicating range of the terminal, the method comprising the following steps:

a) transmitting call messages from the terminal, at least one of the terminal, the call messages, and the plurality of portable objects including a probability modulation parameter (PMP), the probability modulation parameter corresponding to a probability that one of the portable objects will respond to one of the call messages, wherein the one portable object changes the probability modulation parameter based on whether the at least one portable object previously responded to one of the call messages transmitted by the terminal;

b) using the PMPs corresponding to those portable objects, determining which ones of the portable objects will respond to the call messages;

c) transmitting a response message by each plurality of portable objects determined in step (b) to respond to the call messages, each response message including an identifier uniquely identifying the respective portable object transmitting the response message;

d) upon the terminal receiving at least one response message and determining an absence of a collision between the respective response messages of portable objects, establishing a specific data communication link between the terminal and each portable object transmitting the response message, respectively, and repeating steps (a) through (d);

e) upon the terminal determining of a collision between the response messages of portable objects and not receiving the response message from any of the portable objects, repeating steps (a) through (d); and wherein the portable object modifies the probability modulation parameter upon receiving one of the marker messages in the absence of any prior response to the call messages as a function of a value of an index that is modified upon receiving one of the marker messages.

12. The method of claim 11, wherein said index is incremented each time a new marker message is received and is reinitialized on receiving a subsequent query message.

13. A method of managing collisions in a system of interchanging data between a plurality of portable objects and a data transceiver terminal suitable for cooperating with portable objects simultaneously present in a communicating range of the terminal, the method comprising the following steps:

a) transmitting call messages from the terminal, at least one of the terminal, the call messages, and the plurality of portable objects including a probability modulation parameter (PMP), the probability modulation parameter corresponding to a probability that at least one of the plurality of portable objects will respond to one of the call messages, wherein the one portable object changes the probability modulation parameter based on whether the one portable object previously responded to one of the call messages transmitted by the terminal;

b) using the PMPs corresponding to those portable objects, determining which ones of the portable objects will respond to the call messages;

c) transmitting a response message from each of the portable objects determined in step (b) to respond to the call messages, each of the response messages including an identifier uniquely identifying the respective portable object transmitting the response message;

d) upon the terminal receiving at least one response message and determining an absence of a collision between the respective response messages of portable objects, establishing a specific data communication link between the terminal and each portable object transmitting the response message, respectively, and repeating steps (a) through (d);

e) upon the terminal determining a collision between the response messages of portable objects and not receiving the response message from any of the portable objects, repeating steps (a) through (d); and wherein a portable object is capable of being inhibited from sending out a response to the call messages by the portable object receiving a special message sent out by the terminal and containing an identifier corresponding to the portable object, the inhibition being removable upon one of initialization of the portable object and reception of a message.

14. For use in a system for controlling collisions that may occur during interchange of data between a data transceiver terminal and portable objects simultaneously present in a communicating range of the terminal, the terminal comprising:

a transmitter for transmitting call messages from the terminal to the portable object, where at least one of the terminal, the call messages, and the portable objects includes a probability value corresponding to a probability that one of the portable objects will respond to the call messages, the call messages including query messages for initializing the probability value and marker messages for permitting the portable objects to modify the probability value upon receiving the marker messages in an absence of a response to the call messages, wherein the transmitter is configured to transmit the marker messages after the query messages;

a receiver for receiving a response message from each portable object for which it was determined should send a response message based on a corresponding probability value, each response message including an identifier identifying the respective portable object sending the response message;

wherein upon receiving a response message, and in an absence of a collision between response messages of portable objects, the terminal is configured to establish a data communication link between the terminal and one of the portable objects sending the response message, and wherein upon the terminal determining a collision between the response messages of portable objects and not receiving the response message from one of the portable plurality of objects, the terminal is configured to transmit one or more further call messages.

15. The terminal of claim 14, wherein the terminal is configured to transmit another query message upon detecting a collision.

16. The terminal of claim 15, wherein the terminal is configured to reduce a time interval between two successive call messages in the absence of a response from a portable object within a predetermined period.

17. The terminal of claim 14, wherein the terminal is configured to inhibit a portable object from responding to the call messages by transmitting an inhibit message containing an identifier corresponding to the portable object.

* * * * *